Sept. 3, 1940.　　　　　D. GÖSSLER　　　　　2,213,342
TORQUE CONVERTER WITH TWO COUPLINGS
Filed June 9, 1937　　　2 Sheets-Sheet 1

Inventor
DIETRICH GÖSSLER,
BY
Toulmin & Toulmin
Attorneys.

Sept. 3, 1940.          D. GÖSSLER          2,213,342
TORQUE CONVERTER WITH TWO COUPLINGS
Filed June 9, 1937          2 Sheets-Sheet 2

INVENTOR
DIETRICH GÖSSLER,
BY
Toulmin & Toulmin
Attorneys

Patented Sept. 3, 1940

2,213,342

UNITED STATES PATENT OFFICE 2,213,342

TORQUE CONVERTER WITH TWO COUPLINGS

Dietrich Gössler, Heidenheim, Brenz, Germany, assignor to American Voith Contact Company, Inc., New York, N. Y.

Application June 9, 1937, Serial No. 147,347

2 Claims. (Cl. 74—189.5)

This invention relates to hydraulic power transmission mechanism or vehicles, and in particular, to rail vehicles driven by internal combustion engines.

One object of this invention is to provide a hydraulic power transmission employing fluid power transmitters arranged in such a manner that one transmitter is used for starting the vehicle, another for medium speeds and a third for high speeds.

Another object is to provide a hydraulic transmission for engine-driven vehicles, wherein a hydraulic torque converter is employed for starting the vehicle, a hydraulic coupling for driving the vehicle at medium speeds and a second hydraulic coupling operatively connected to the axle with a different driving ratio to drive the vehicle at a high speed.

Another object is to provide a driving mechanism for a vehicle consisting of three fluid power transmitters, including a hydraulic torque converter and a pair of hydraulic couplings with their primary rotors driven in common, but with the secondary rotor of one coupling operatively connected to the driven axle with a different driving ratio than the other coupling, one of these power transmitters being employed at a time by filling it with fluid while emptying the other transmitters.

Another object is to provide a transmission mechanism for vehicles, wherein a hydraulic torque converter and a hydraulic coupling are connected by gearing of one driving ratio to the driven axle, and wherein another hydraulic coupling is connected to the driven axle through gearing of another driving ratio. The torque converter is employed for starting the vehicle and bringing it up to a medium speed, and the hydraulic coupling associated with the torque converter is employed for driving the vehicle at a medium speed, whereas the second coupling with the different driving ratio is employed to drive the vehicle at a high speed.

Another object is to provide a vehicle driving mechanism consisting of a turbo transmission with one torque converter and two hydraulic couplings, these two couplings being arranged to drive the axle at different speed reductions so that the two couplings may be used at medium and high speeds, respectively, to improve the efficiency and tractive effort of the transmission.

In general, the vehicle driving arrangement of this invention consists of an engine connected to a driving mechanism through a hydraulic transmission consisting of three fluid power transmitters. The impellers or primary rotors of these three transmitters are interconnected and driven simultaneously from the engine. Two of the transmitters, however, consist of a hydraulic torque converter and a hydraulic coupling having runners or secondary rotors which are connected, through gearing of one ratio, to the axle of the vehicle. The third power transmitter consists of a hydraulic coupling having its runner or secondary rotor connected to the axle through gearing of a different ratio from that of the first coupling and torque converter, respectively.

When the vehicle is started the torque converter alone is filled with fluid, and operates to transmit the power at low speeds. When a medium speed is reached the torque converter is emptied and the first coupling is filled, this coupling transmitting the power while the medium speed is maintained. When a high speed is desired, however, the medium speed coupling is emptied and the second or high speed coupling is filled, thereby causing the power to be transmitted from the engine to the axle through gearing of a different ratio than in the case of the medium speed coupling and low speed torque converter.

By this arrangement the efficiency of the vehicle is considerably increased because the tractive effort is more efficiently related to the power input for the given speed of the vehicle. At low speeds the torque converter gives the necessarily large tractive effort required, whereas at medium speeds the medium speed coupling operates efficiently to provide the lowered tractive effort at this medium speed. The provision of the high speed coupling, with its gearing of different ratio, enables the vehicle to be operated with a more efficient utilization of the power at the lowered tractive effort required for such high speeds. As the three fluid power transmitters are placed in and out of operation simply by filling and emptying them, respectively, the shift from one gear ratio to another, or from one transmitter to another, may be made quickly and easily. During travel only one such fluid power transmitter is in use at a given time, hence, only one is filled at a given time.

Figure 2:
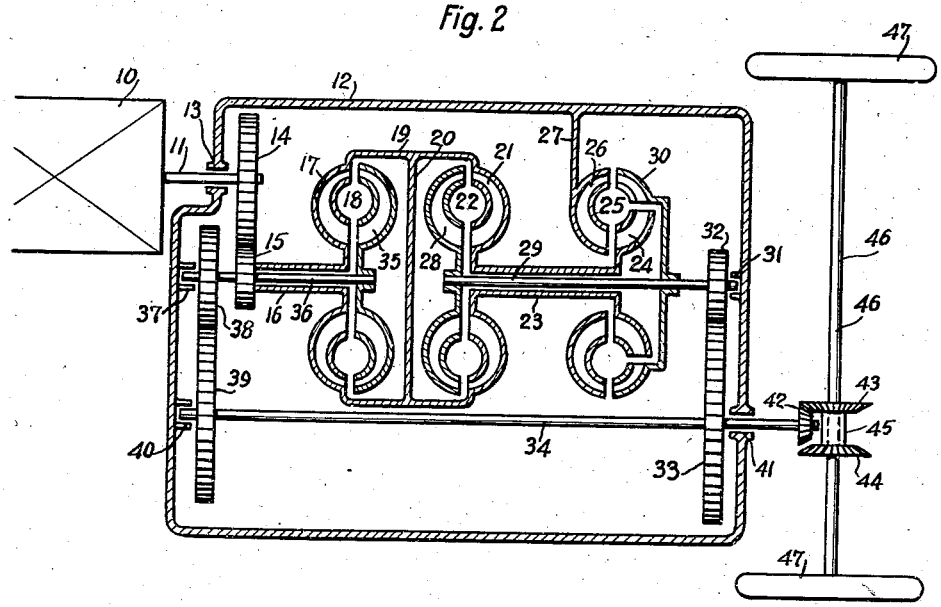
Figure 2 is a diagrammatic view, partly in section, of a hydraulic transmission for vehicles according to one embodiment of the invention.

Referring to the drawing in detail, Figure 2 shows one embodiment of the vehicle driving arrangement of this invention as consisting of an engine 10, such as a Diesel engine, having a shaft 11 entering a transmission casing 12 through an aperture 13. Mounted on the shaft 11 is a gear 14 driving a pinion 15 upon a tubular shaft 16, upon which is mounted the impeller or primary rotor 17 of the high speed hydraulic coupling, generally designated 18. The primary rotor or impeller 17 is interconnected by a drum-like portion 19 with a dividing partition 20 to the primary rotor or impeller 21 of the medium speed hydraulic coupling, generally designated 22. The latter is connected to a tubular shaft 23, upon which is also mounted the impeller or primary rotor 24 of the low speed hydraulic torque converter, generally designated 25. The guide wheel 26 of the torque converter 25 is secured by the member 27 to the transmission casing 12 so that it is securely anchored in a stationary position.

The runner or secondary rotor 28 of the medium speed coupling 22 is mounted upon a shaft 29, on which is also mounted the runner or secondary rotor 30 of the low speed torque converter 25. The shaft 29 is journalled, as at 31, in the transmission casing 12 and carries a pinion 32 meshing with a gear 33, mounted upon the driven element or propelling shaft 34. The secondary rotor or runner 35 of the high speed coupling 18, however, is mounted upon an independent shaft 36 passing loosely through the tubular shaft 16 and pinion 15, and is journalled at its opposite end at 37 in the casing 12. The shaft 36 carries a pinion 38 meshing with a gear 39, likewise mounted upon the propelling shaft 34. It will be observed, however, that the gears 38 and 39 are of a different ratio from the gears 32 and 33. With equal speeds of the secondary rotor shafts 36 and 29, therefore, a higher speed will be imparted to the propelling shaft 34 through the gearing 38 and 39 than through the gearing 32 and 33. The propelling shaft 34 is journalled at 40 in the transmission casing 12, and emerges through an aperture 41 at the opposite end thereof. The outer end of the propelling shaft 34 carries a bevel gear 42 meshing selectively with bevel gears 43 or 44, mounted upon a hub 45 which is splined or otherwise drivingly connected to the vehicle axle 46, and thereby providing reverse gearing. The axle 46 is provided with vehicle wheels 47 at its opposite ends.

In the operation of the invention, the engine 10 is started and the low speed torque converter 25 is filled with fluid. When this occurs the engine shaft 11 drives the tubular shaft 16 and primary rotors or impellers 17, 21 and 24 of the hydraulic power transmitters 18, 22 and 25. The power transmitters 18 and 22, however, are emptied, hence, the power transmission at this time occurs solely through the torque converter 25. This arrangement causes a large tractive effort to be exerted upon the runner or secondary rotor 30 and shaft 29, and this effort is transmitted through the gearing 32 and 33 to the propelling shaft 34, and thence, through the gearing 42 and 43 to the axle 46 and wheels 47. Thus the vehicle is provided with a large tractive effort at the time when the largest tractive effort is needed, namely, in starting the vehicle.

When the vehicle has reached a medium speed the low speed torque converter 25 is emptied and the medium speed coupling 22 is filled, thereby transferring the power-transmitting function from the torque converter 25 to the coupling 22. The coupling 22, through its secondary rotor or runner 28, continues to drive the common shaft 29, through the previously mentioned gearing 32, 33, 42 and 43, and this drive continues as long as a medium speed is maintained.

When it is desired to shift to a high speed, however, the medium speed coupling 22 is emptied and the high speed coupling 18 is filled with fluid. The driving effort is now transferred from the shaft 29 to the shaft 36, and power is now transmitted from the secondary rotor or runner 35 of the high speed coupling 18, through the shaft 36, gearing 38 and 39, propelling shaft 34, gearing 42 and 43 and axle 46 to the vehicle wheels 47. Thus the gearing 38 and 39 of a different ratio maintains the driving of the vehicle more efficiently at the high speed than would have been the case had the medium speed coupling 22 been used to maintain the drive through the different ratio gearing 32 and 33.

Figure 1:
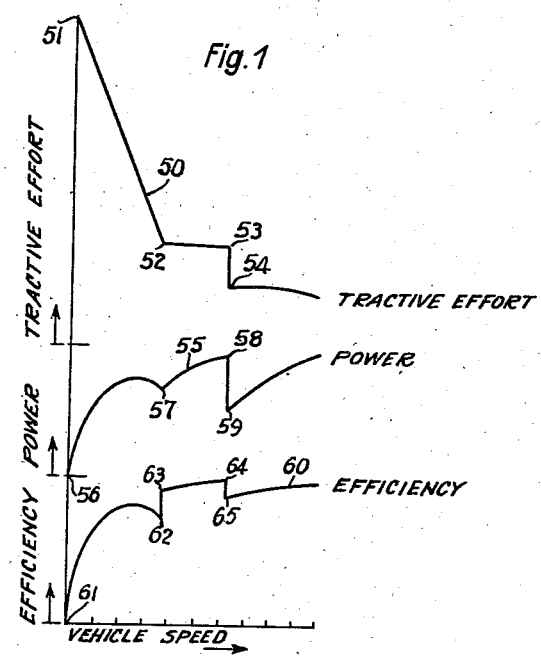
Figure 1 is a graph showing three curves, wherein the speed of the vehicle is brought into relationship with the efficiency, power and tractive effort, respectively.

Figure 1 shows graphically the results of employing the three different power transmitters at two different gear ratios for driving the propelling shaft 34 and axle 46. The curve 50 shows the tractive effort obtained for the vehicle in the three stages of its motion, the speed of the vehicle being indicated by the horizontal components or abscissae. The ordinates, however, show the variation in the tractive effort. From the point 51 to the point 52 the low speed torque converter is in operation and the high tractive effort is initially applied, which is reduced as the vehicle gathers speed, until the point 52 is reached. The medium speed coupling 22 comes into operation and drives the vehicle up to the point 53, wherein the high speed coupling 18 is filled. The subsequent drive takes place on the portion of the curve from 54, onward. Meanwhile, the power curve 55 indicates the effect on the power during the same three periods. From the point 56 to 57 the power rises, and then falls slightly while the low speed torque converter 25 is in operation. From 57 to 58, however, the medium speed coupling 22 is in operation, and the power rises again. From the point 59 onward, however, the high speed coupling 18 is in operation, and the power steadily rises after an initial drop.

The third and final curve 60 follows a similar course to the power curve from its zero point 61 to the change-over point 62 from the torque converter 25 to the medium speed coupling 22. The efficiency rises instantly to the point 63, and continues to the point 64 so long as the medium speed coupling 22 is in operation. When the shift is made to the high speed coupling the efficiency curve drops slightly to the point 65, and then continues onward in the manner shown in the lowest curve in Figure 1.

Figure 3:
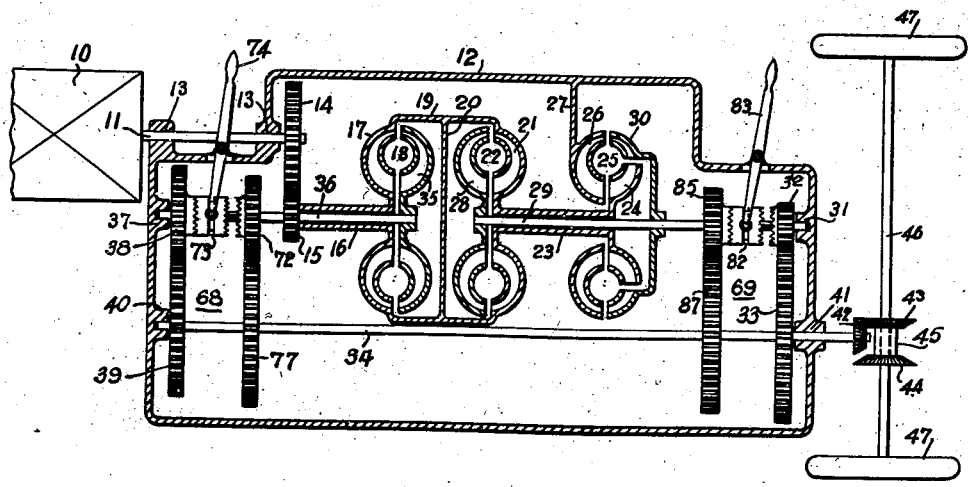
Figure 3 is a modification showing a change speed device for connecting one output shaft to said propelling shaft, and a separate change speed device of a different speed ratio from said first change speed device for connecting the other output shaft to said propelling shaft.

The modification of Figure 3 provides a change speed gearing assembly 68 for connecting one of the runners 35 to said driven element 34, and a second change speed gearing assembly 69 of a different speed ratio for connecting the other runner 30 to said driven element 34. The jaw clutches 73 and 82 are shifted by the levers 74 and 83 to select the drive from the shafts 36 and 29 to the shaft 34, either through the left-hand gears 38, 39 or 72, 77 or through the righthand gears 32, 33 or 85, 87, respectively. These provide separate change speed devices for independently connecting said runners to said driven element at different speed ratios. These are conventional and their details form no part of the present invention.

It will be understood that I desire to comprehend within my invention such modifications as come within the scope of the claims and the invention.

Having thus fully described my invention, what I claim as new and desire to secure by Letters Patent, is:

1. In an engine-driven vehicle, an engine-driven shaft means, a pair of hydraulic couplings and a hydraulic torque converter having impellers and runners, said impellers being mounted upon said engine-driven shaft means for rotation in unison therewith, a pair of output shafts within said engine-driven shaft means, the runner of one hydraulic coupling being connected to one output shaft and the runners of the torque converter and the other hydraulic coupling being connected to the other output shaft, a propelling shaft, and means for connecting said output shafts to said propelling shaft at different speed ratios.

2. In an engine-driven vehicle, an engine-driven shaft means, a pair of hydraulic couplings and a hydraulic torque converter having impellers and runners, said impellers being mounted upon said engine-driven shaft means for rotation in unison therewith, a pair of output shafts within said engine-driven shaft means, the runner of one hydraulic coupling being connected to one output shaft and the runners of the torque converter and the other hydraulic coupling being connected to the other output shaft, a propelling shaft, a change speed device for connecting one output shaft to said propelling shaft, and a separate change speed device of a different speed ratio from said first change speed device for connecting the other output shaft to said propelling shaft.

DIETRICH GÖSSLER.